US008605348B2

(12) United States Patent
Bosma (10) Patent No.: US 8,605,348 B2
(45) Date of Patent: Dec. 10, 2013

(54) SYSTEMS AND METHODS FOR RENDERING RESIZABLE IMAGE INCLUDING RESIZABLE MASK

(75) Inventor: Paul Bosma, Nederland, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 720 days.

(21) Appl. No.: 12/346,746

(22) Filed: Dec. 30, 2008

(65) Prior Publication Data

US 2010/0165362 A1    Jul. 1, 2010

(51) Int. Cl.
*H04N 1/46* (2006.01)

(52) U.S. Cl.
USPC .......... 358/540; 358/1.14; 358/1.15; 358/1.9; 400/62; 382/164; 715/734; 709/223

(58) Field of Classification Search
USPC ......... 358/1.18, 1.2, 450, 540, 1.14, 1.15, 1.9
See application file for complete search history.

(56) References Cited

U.S. PATENT DOCUMENTS

| | | | |
|---|---|---|---|
| 6,839,149 B2 * | 1/2005 | Herr | 358/540 |
| 2007/0020009 A1 * | 1/2007 | Fukuda | 400/62 |
| 2007/0153331 A1 * | 7/2007 | Ueda et al. | 358/1.18 |
| 2008/0246854 A1 * | 10/2008 | Tsuji et al. | 348/222.1 |
| 2009/0009791 A1 * | 1/2009 | Yamagata et al. | 358/1.14 |
| 2009/0147288 A1 * | 6/2009 | Matsuda | 358/1.9 |

OTHER PUBLICATIONS

PDF reference, 3rd ed., Adobe Portable Document Format Version 1.4, Adobe Systems Incorporated, Addison Wesley (2001).

* cited by examiner

*Primary Examiner* — Benny Q Tieu
*Assistant Examiner* — Juan M Guillermety
(74) *Attorney, Agent, or Firm* — Finnegan, Henderson, Farabow, Garrett & Dunner, L.L.P.

(57) ABSTRACT

Methods disclosed permit compositing operations to be performed on images using an associated mask even in situations where the image and the mask differ in size. In some embodiments, image and mask data may be specified as a soft mask image in a page description language such as PDF. Scaling operations may be performed on the image, mask, or on both the image and mask when they differ in size. Compositing operations may be performed on the scaled image and/or mask after they have been scaled to the same size. Composting operations in situations where the original mask and image are of the same size are not affected by scaling operations.

20 Claims, 7 Drawing Sheets

SYSTEMS AND METHODS FOR RENDERING RESIZABLE IMAGE INCLUDING RESIZABLE MASK

BACKGROUND

1. Field of the Invention

The present invention relates to the field of printing and in particular, to systems and methods for rendering images in print devices.

2. Description of Related Art

Imaging models such as those provided in Adobe's PDF™ often include the notion of transparency. With opaque objects the topmost object completely obscures the overlapping portions of any underlying object. When imaging models permit transparency, the color of a point on a page may be determined by potentially combining the colors of all objects enclosing the point in a blend-mode according to transparency-model specified compositing rules.

When an object is placed on a page, the object may be composited with a backdrop. Conceptually, the backdrop can be thought of as the result of compositing all previously specified objects. Compositing an object with its backdrop involves blending the objects color with the color of the backdrop at each point. Two parameters, termed shape and opacity determine how an object will be composited with its backdrop. Much like color components, shape and opacity, which vary from 0 to 1, may be specified for each pixel in an object. For opacity, the value 0 implies fully transparent, while 1 implies fully opaque. For shape, 0 indicates that a point lies outside an object with a sharp well-defined edge, while 1 indicates that the point lies inside the object. Values between 0 and 1 may be used in connection with objects with amorphous or soft edges.

The opacity of the object and the opacity of the backdrop determine their respective color contributions to blended and composited colors. Next, the object's shape determines the extent to which the composite color replaces the backdrop color. In some imaging models, one or more consecutive stack objects may be grouped and opacity and shape may be associated with the group thereby affecting blending and compositing operations that pertain to the group as a whole. When the group is composited, the color result of compositing the group may be converted to a luminosity value for each group pixel, which may be associated with the group as a "soft mask". Thus, the soft mask can be used for shape or opacity values pertaining to an object or a group when additional compositing operations are performed. The soft mask is often used for soft clipping, where the shape of an object or group is modified. Soft clipping can produce effects such as a gradual transition, fading etc. between an object and its backdrop. The soft mask is typically stored independently of the object being composited. In many printing applications, however, the print data stream may comprise of an image and a soft mask of differing dimensions. Accordingly, there is a need for systems and methods to process print data streams where the dimensions of the image and soft mask are different.

SUMMARY

Consistent with embodiments disclosed herein, systems and methods for processing print data streams with image and soft mask data are presented. A computer-implemented method for performing compositing operations on a print data stream comprising at least one image of a first size, wherein the image is associated with a mask of a second size is disclosed. In some embodiments, the method comprises: comparing the first and second sizes; scaling the image and the mask to a third size, if the first and second size are different; and performing compositing operations using the scaled image and scaled mask, if the first and second sizes are different.

Embodiments also relate to software, firmware, and program instructions created, stored, accessed, or modified by processors using computer-readable media or computer-readable memory. The methods described may be performed on a computer and/or a printing device.

These and other embodiments are further explained below with respect to the following figures.

DETAILED DESCRIPTION

In accordance with embodiments disclosed herein, systems and methods for processing print data streams are presented. The print data streams may include soft mask images that include image data and associated soft mask data.

Figure 1:
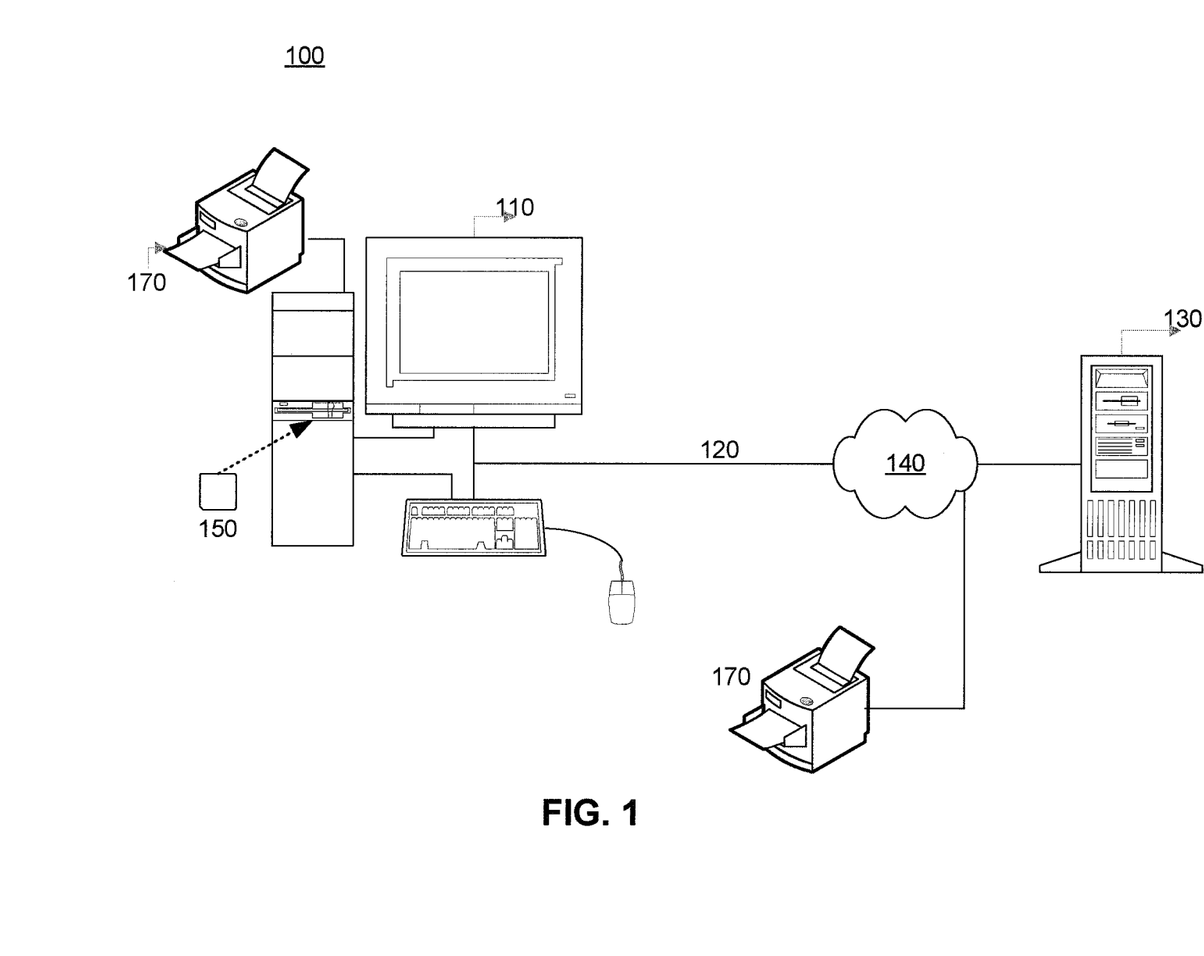
FIG. 1 shows a block diagram illustrating components in an exemplary system for processing print data streams with image and soft mask data.

FIG. 1 shows a block diagram illustrating components in an exemplary system for printing documents. An application for processing print data streams with image and soft mask data may be deployed on a network of computers and printing devices, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Document processing software running on computing device 110 and/or server 130 may allow users to view, edit, process, and store documents conveniently. Pages to print in a document may be described in a page description language ("PDL") that permits the use of soft masks such as Adobe™

PDF and variants thereof. A PDL description of a document provides a high-level description of each page in a document. This PDL description is often translated to a series of lower-level printer-specific commands when the document is being printed.

The translation process from PDL to lower-level printer-specific commands may be complex and depend on the features and capabilities offered by exemplary printer 170. For example, printer 170 may process its data in stages. In a first stage, printer 170 may parse PDL commands and break down high-level instructions into a set of lower level instructions called primitives. These primitives may be fed to a subsequent stage in exemplary printer 170, which may use them to determine where to place marks on a page. In some instances, each primitive may be processed as it is generated. In other systems, a large set of primitives may be generated, stored, and then processed. For example, the primitives needed to describe a single page may be generated, stored in a list, and then processed. A set of stored primitives is termed an intermediate list or a display list.

In general, printer 170 may be any device that can be configured to produce physical documents from electronic data including, but not limited to, electro-photographic printers, such as laser printers and LED printers, ink-jet printers, thermal printers, laser imagers, and offset printers. Printer 170 may have an image transmitting/receiving function, an image scanning function, and/or a copying function, as installed in facsimile machines and digital copiers. Exemplary printer 170 may also be capable of directly printing documents received from computing device 110 or server 130 over connection 120. In some embodiments such an arrangement may allow for the direct printing of documents, with (or without) additional processing by computing device 110 or server 130. The processing of documents, which may contain one or more of text, graphics, and images, including soft mask images can be distributed. Thus, computing device 110, server 130, and/or the printer may perform portions of document print processing such as soft mask image processing, display list generation, half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives. Portions of applications may reside on removable media and be read by computing device 110 using removable media drive 150 prior to being acted upon by system 100.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection.

Network 140 could include a Local Area Network (LAN), a Wide Area Network (WAN), or the Internet. Printer 170 may be connected to network 140 through connection 120. Exemplary printer 170 may also be connected directly to computing device 110 and/or server 130. System 100 may also include other peripheral devices (not shown). An application for processing print data streams with image and soft mask data may be deployed on one or more of the exemplary computers or printers, as shown in FIG. 1. For example, computing device 110 could execute software that may be downloaded directly from server 130, and portions of the application may also be executed by exemplary printer 170.

Figure 2:
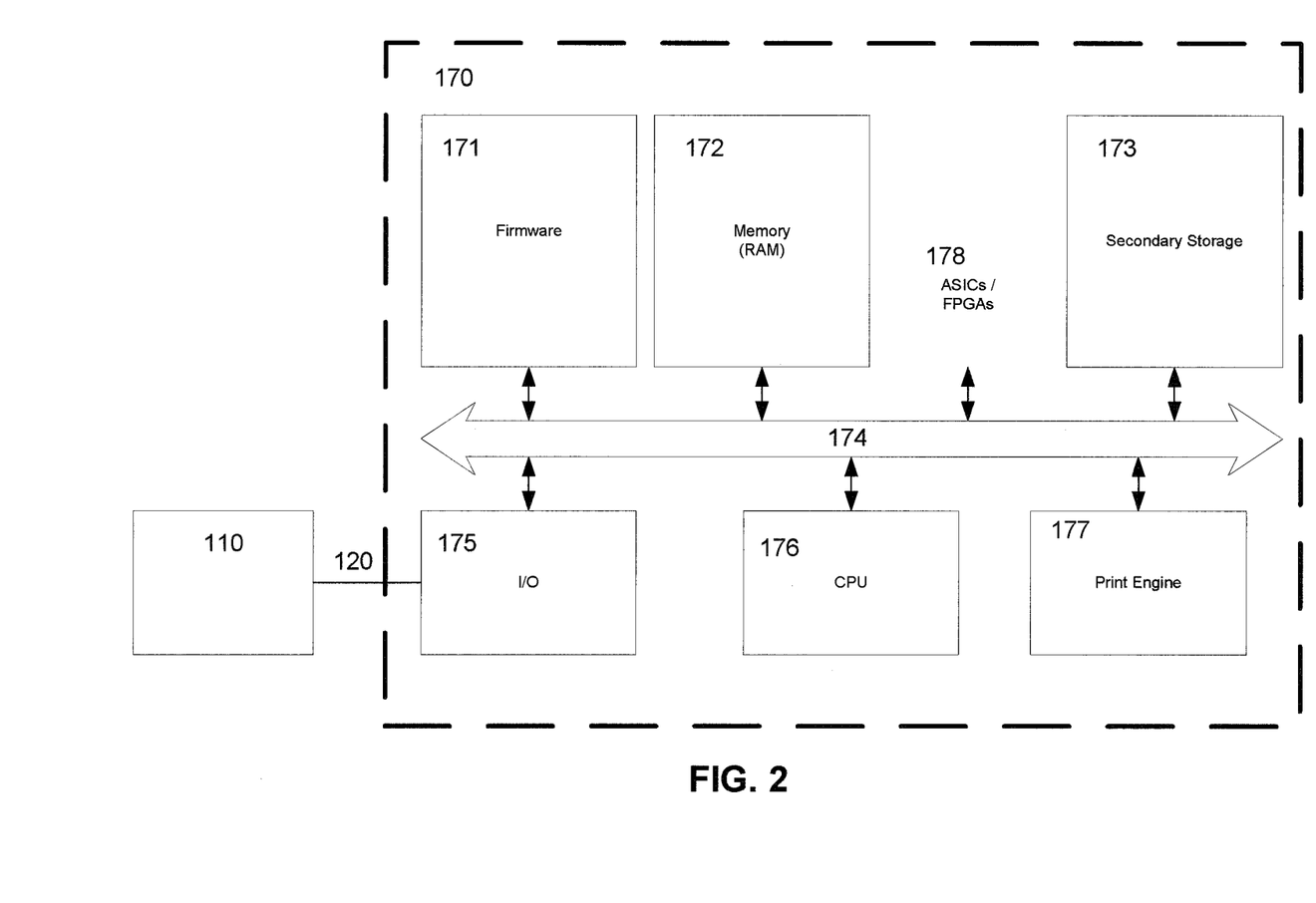
FIG. 2 shows a high level block diagram of an exemplary printer.

FIG. 2 shows a high-level block diagram of exemplary printer 170 coupled to a computing device 110 over connection 120. Exemplary printer 170 may contain bus 174 that couples CPU 176, firmware 171, memory 172, input-output ports 175, print engine 177, and secondary storage device 173. Exemplary printer 170 may also contain other Application Specific Integrated Circuits (ASICs), and/or Field Programmable Gate Arrays (FPGAs) 178 that are capable of executing portions of an application to print or process documents. Exemplary printer 170 may also be able to access secondary storage or other memory in computing device 110 using I/O ports 175 and connection 120. In some embodiments, printer 170 may also be capable of executing software including image extraction and processing software, data compression and decompression, a printer operating system and other appropriate application software. Exemplary printer 170 may allow paper sizes, output trays, color selections, and print resolution, among other options, to be user-configurable.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for processing print data streams with image and soft mask data, blending, compositing, image processing, trapping, document processing, and other code. In some embodiments, code and data in firmware 171 may be copied to memory 172 prior to being acted upon by CPU 176. Routines in firmware 171 may include code to translate page descriptions received from computing device 110 to display lists. In some embodiments, firmware 171 may include rasterization routines to convert display commands in a display list to an appropriate rasterized bit map and store the bit map in memory 172. Firmware 171 may also include compression and memory management routines. Data and instructions in firmware 171 may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one or more of translation, compression, decompression, compositing, and rasterization algorithms.

Exemplary computing device 110 may transform document data into a first printable data. In some embodiments, the first printable data may correspond to a PDL description of a document. Then, the first printable data can be sent to printer 170 for transformation into intermediate printable data. In some embodiments, the first printable data may include soft mask image data, which can include image data and an associated mask. In some embodiments, the translation process from a PDL description of a document to the final printable data comprising of a series of lower-level printer-specific commands may include the generation of intermediate printable data comprising of display lists of objects. Display lists may hold one or more of text, graphics, and image data objects and one or more types of data objects in a display list may correspond to an object in a user document.

Display lists, which may aid in the generation of final printable data, may be stored in memory 172 or secondary storage 173. Exemplary secondary storage 173 may be an internal or external hard disk, memory stick, or any other memory storage device capable of being used by system 200. In some embodiments, the display list may reside and be transferred between one or more of printer 170, computing device 110, and server 130 depending on where the document processing occurs. Memory to store display lists may be a dedicated memory or form part of general purpose memory, or some combination thereof. In some embodiments, memory to hold display lists may be dynamically allocated, managed, and released as needed. Printer 170 may transform intermediate printable data into a final form of printable data and print according to this final form.

Figure 3:
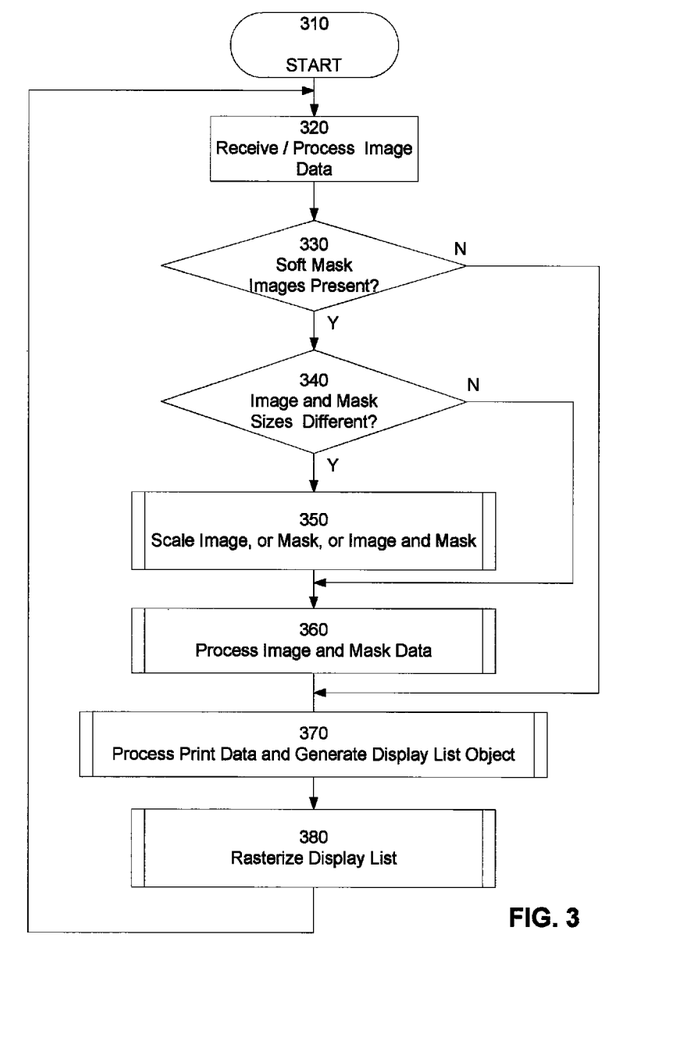
FIG. 3 shows an exemplary flowchart illustrating steps in a method for processing print data streams with soft mask images that include image and mask data.

FIG. 3 shows an exemplary flowchart illustrating steps in an algorithm 300 for processing print data streams with soft mask images that contain image and mask data. In some embodiments, mask data may comprise a luminosity value for each color component. For the purposes of this discussion, an image of height M and width N (denoted as M×N) and associated mask of size P×Q are considered of equal size if M=P and N=Q. If the product of M and N is greater than the product of P and Q, then the image is larger than the mask, whereas if the product of M and N is less than the product of P and Q, then the image is smaller than the mask.

In some embodiments, the algorithm may commence in step 310 and a print data stream may be received in step 320. In some embodiments, the print data stream may be a PDL stream, such as PDF, or any other stream that permits the specification of transparency using mask information. In step 320, print job data 315 may also be subjected to language processing. In some embodiments, language processing may be performed by a language server. For example, a language server may take PDL language-level objects and process the language level objects.

In step 330, data from the print stream may be parsed to check if the data includes image data associated with mask data, such as those occurring with PDF soft mask images. If image data includes soft mask images ("Y" in step 330) then, in step 340, the dimensions of both the image data and mask data may be determined and compared. If image data does not include soft mask images ("N" in step 330) then, the algorithm may proceed to step 370.

If the dimensions of the image data and mask data are the same ("N" in step 340) then, the algorithm may proceed to step 360. If the dimensions of the image data and mask data are not the same ("Y in step 340) then, in some embodiments, an image scaler may be invoked in step 350.

Exemplary pseudo-code shown below illustrates data for a soft mask image that has a mask of different dimensions from the image. The data below represents a 2×2 image with an associated mask that is 68×93. Some portions of the code have been emphasized, while other portions have been redacted for clarity.

```
% softmask image object:
object 7 0
<<
    /BitsPerComponent 1
    /ColorSpace [/Indexed /DeviceRGB 1
    <000000ffffff>]
    /Height 2
```

-continued

```
    /SMask 8 0 R
    /Subtype /Image
    /Type /XObject
    /Width 2
>>
< -- binary data for image would appear here -- >
Endobject
% mask object:
object 8 0
<<
    /BitsPerComponent 1
    /ColorSpace /DeviceGray
    /Filter /FlateDecode
    /Height 93
    /Subtype /Image
    /Type /XObject
    /Width 68
>>
< -- binary data for mask would appear here-- >
Endobject
[end]
```

The pseudo-code above describes a soft mask image object with an image object (object 7 0) of size 2×2 (as indicated by the statements/Height 2 and/Width 2). Also described is a mask object (object 8 0) of size 93×68 (as indicated by the statements/Height 93 and/Width 68). Data for the image and mask objects has been omitted from the code snippet shown above to simplify presentation.

The image scaler may act on the image and mask data by (i) scaling the mask to the dimensions of the image, or (ii) scaling the image to the dimensions of the mask, or (iii) scaling the image and mask to some common dimension. Whether an image or a mask is scaled may be based on a variety of factors including, maintaining image resolution, the maximum resolution of the printing device, the resolution at which the image is to be physically printed, processing time considerations, and/or the memory available on printer 170 for processing. In some embodiments, the smaller-dimensioned object (in area) may be scaled to the larger dimension, unless the larger object exceeds some upper size threshold. In some embodiments, the upper size threshold may be specified by a user or may be determined from system parameters. For example, a mask may be scaled up to the dimensions of its associated image. Conversely, in other embodiments, a larger-dimensioned object (in area) may be scaled down to the smaller dimension, unless the smaller object is below some lower size threshold. In some embodiments, if one or both objects fall outside the threshold then both objects may be scaled to some acceptable size. Note that the image object and mask may be scaled by different ratios even though their final dimensions may be identical. Further, one object may be scaled up, while the other may be scaled down. Various other combinations are possible as would be apparent to one of ordinary skill in the art. In some embodiments, the type of scaling that is performed may be user-selectable. For example, a user may specify that the mask be scaled to the size of the image whenever possible, or whenever the image is larger.

In step 360, image and mask data, which are now of equal dimensions, may be processed to obtain a resultant image. In some embodiments, the scaled soft mask may derive shape and opacity values from the original (unscaled) soft mask. Processing operations may include various types of compositing operations including soft clipping, where the shape of an object or group is modified. Soft clipping can produce effects such as a gradual transition, fading etc. between an object and its backdrop.

In step 370, other print data may be processed and objects placed in a display list. For example, PDL language-level objects may be transformed into data, image, text, and graphical objects and these objects may be added to a display list. The display list may be an intermediate step in the processing of data prior to actual printing and may be parsed before conversion into a subsequent form. The conversion process from a display list representation to a form suitable for printing on physical media may be referred to as rasterizing the data or rasterization. Display list may include such information as color, opacity, luminosity, boundary information, and depth for display list objects.

In step 380, the display list may be rasterized. For example, basic rasterization may be accomplished by taking a 3-dimensional scene, typically described using polygons, and rendering the 3-dimensional scene onto a 2-dimensional surface. Polygons can be represented as collections of triangles. A triangle may be represented by 3 vertices in the 3-dimensional space. A vertex defines a point, an endpoint of an edge, or a corner of a polygon where two edges meet. Thus, basic rasterization may transform a stream of vertices into corresponding 2-dimensional points and fill in the transformed 2-dimensional triangles. Upon rasterization, the rasterized data may be stored in a frame buffer, which may be physically located in memory 172. Print engine 177, may process the rasterized data in frame buffer 350, and form a printable image of the page on a print medium, such as paper.

For example, a Raster Image Processing (RIP) module may process objects in the display list and generate a rasterized equivalent in frame buffer. In some embodiments, raster image processing may be performed by printer 170. For example, raster image processing may be performed by printer 170 using one or more of CPU 176, ASICs/FPGAs 178, memory 172, and/or secondary storage 173. Raster image processing may be performed by printer 170 using some combination of software, firmware, and/or specialized hardware such as ASICs/FPGAs 178. The frame buffer may hold a representation of print objects in a form suitable for printing on a print medium by print engine 177.

In some embodiments, algorithm 300 may be implemented in a new product, or as a modification, upgrade, and/or patch to existing print data processing algorithms on printer 170. In some embodiments, algorithm 300 may be implemented in firmware 171 and/or ASICs/FPGAs 178, and operate under the control of CPU 176. For example, program code residing in secondary storage 173 and firmware 171 may be copied to main memory 172 and be acted upon by CPU 176, which may offload one or more tasks to ASICs/FPGAs 178. In general, algorithm 300 may be implemented by some combination of hardware, software, and/or firmware.

Figure 4A:
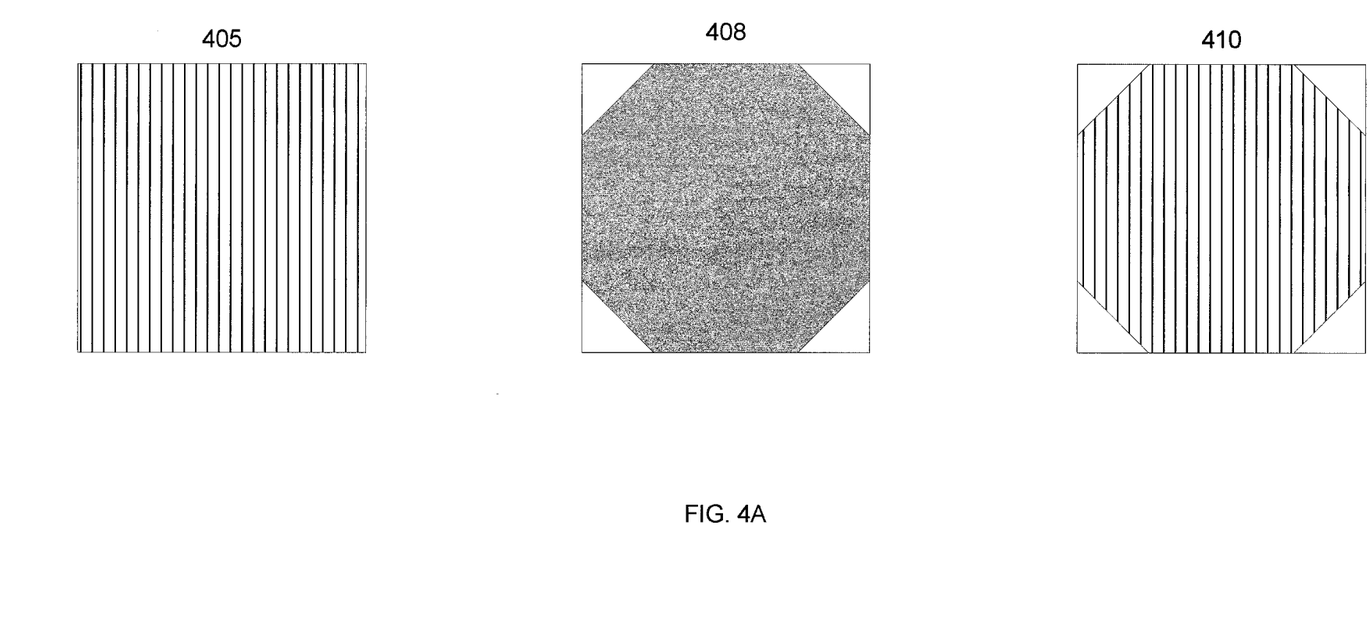
FIG. 4A depicts an exemplary operation involving an image object and a soft mask.

FIG. 4A depicts an exemplary operation involving an image object and a soft mask. As shown in FIG. 4A, an image object 405 may be composited with mask 408 and result 410 may be obtained from the compositing process. In FIGS. 4A, 4B, 4C, and 4D, the lines in image objects 405, 415, and 420 indicate the portion of an object that is filled with some color. For the purposes of FIG. 4A, image object 405 and mask 408 are assumed to have the same dimensions. As shown in FIG. 4, compositing square object 405 with hexagonal mask 408 results in the clipping of object 405 and yields composite object 410.

Figure 4B:
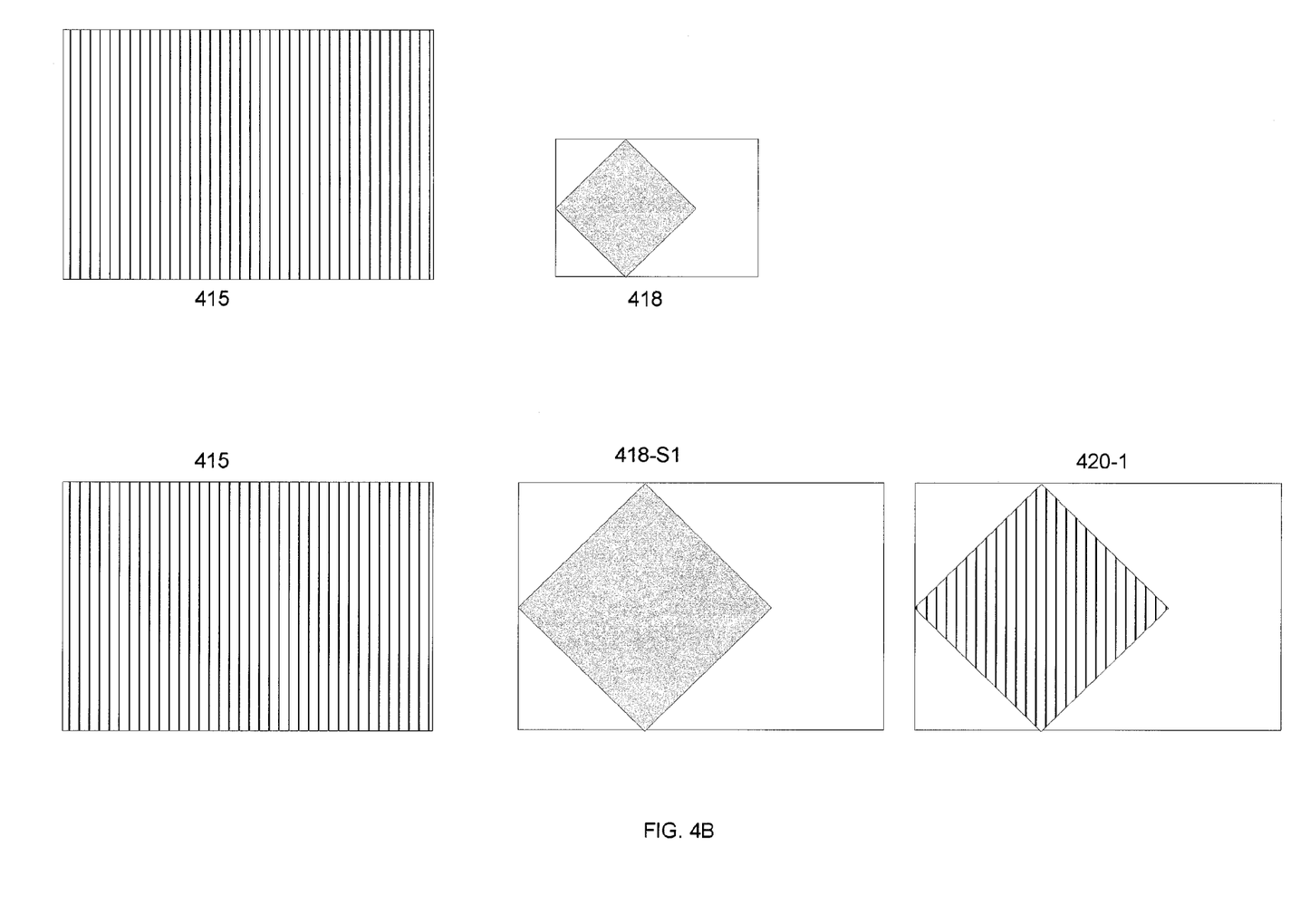
FIG. 4B shows an exemplary compositing operation where an exemplary mask is scaled up to the size of the associated image object.
Figure 4C:
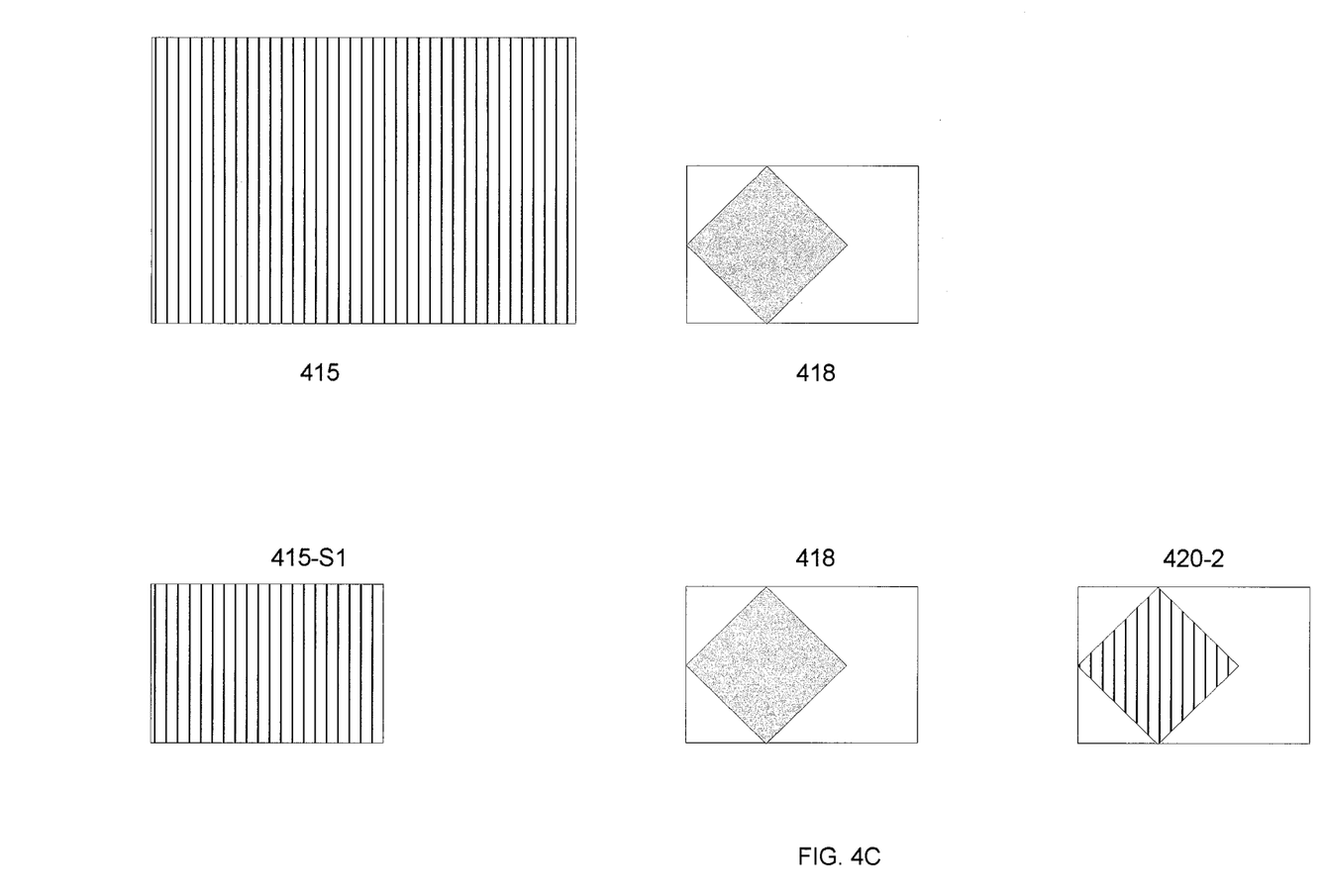
FIG. 4C shows an exemplary operation where an exemplary image is scaled down to the size of the associated soft mask.
Figure 4D:
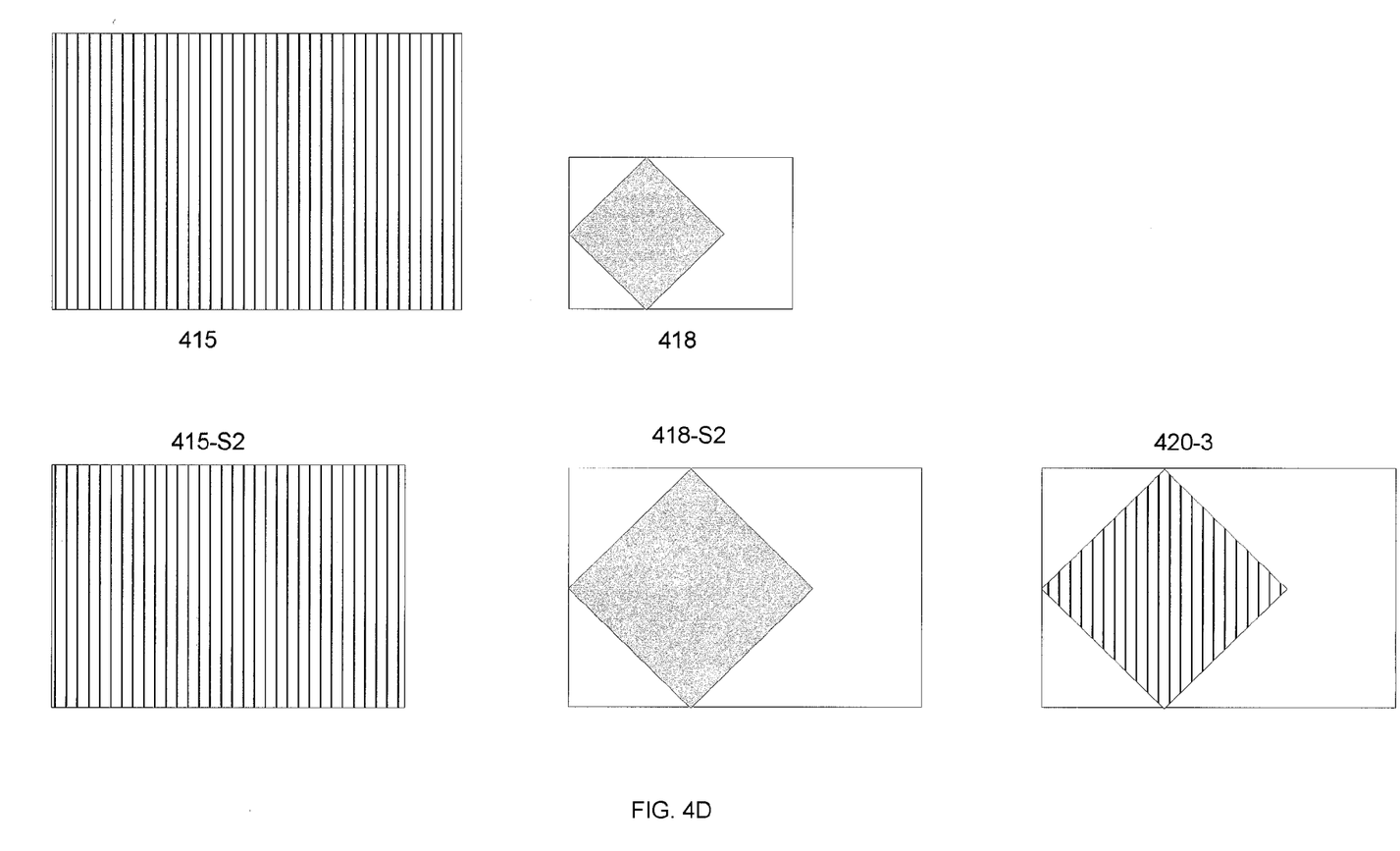
FIG. 4D shows an operation where the exemplary object and the associated mask are both scaled to have the same dimension.

FIGS. 4B, 4C, and 4D depict exemplary objects with associated masks, scaled objects and/or scaled masks, and the results of exemplary compositing operations using the scaled entities. In some embodiments, the scaling operations shown in FIGS. 4A-D may be performed by an image scaler.

FIG. 4B shows an exemplary compositing operation where an exemplary mask is scaled up to the size of the associated image object. FIG. 4B shows an exemplary image object 415 with associated mask 418, which differ in dimension. As shown in FIG. 4B, mask 418 has been scaled up to mask 418-S1, which has the same dimensions as image object 415. As shown in FIG. 4, compositing square object 415 with equal-sized diamond-shaped mask 418-S1 results in the clipping of object 415 and yields composite object 420-1.

FIG. 4C shows an exemplary operation where an exemplary image is scaled down to the size of the associated soft mask. FIG. 4B shows an exemplary image object 415 with associated mask 418, which differ in dimension. As shown in FIG. 4B, image object 415 has been scaled down to image object 415-S1, which has the same dimensions as mask object 418. As shown in FIG. 4, compositing scaled square object 415-S1 with equal-sized diamond-shaped mask 418 results in the clipping of object 415-S1 and yields composite object 420-2.

FIG. 4D shows an operation where the exemplary object and the associated mask are both scaled to have the same dimension. FIG. 4D shows an exemplary image object 415 with associated mask 418, which differ in dimension. As shown in FIG. 4B, image object 415 has been scaled down to image object 415-S2, while mask 418 has been scaled up to 418-S2. Image object 415-S2 and mask 418-S2 have the same dimensions. As shown in FIG. 4, compositing scaled square object 415-S2 with scaled diamond-shaped mask 418 results in the clipping of object 415-S2 and yields composite object 420-3.

In some embodiments, a program for conducting the process described in algorithm 300 can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A computer-implemented method for performing compositing operations, the computer-implemented method comprising:
    receiving print data streams, in the form of print description language streams;
    processing, by a language server, the print data streams comprising:
        parsing the print data streams to select at least one print stream that includes image data associated with mask data for performing compositing operations,
            wherein the at least one print stream comprising at least one image of a first size, the image being associated with a mask of a second size;
        comparing the first size to the second size;

scaling the image and the mask to a third size, if the first size and the second size are different based on the comparison; and performing compositing operations using the scaled image and the scaled mask, if the first size and second size are different, wherein the compositing operations comprise clipping the image based on an overlap of the mask of the third size overlaid on the image of the third size;

generating a composited object as a result of the compositing operations; and generating a display list including the composited object.

2. The computer-implemented method of claim 1, wherein the third size is different from the first size and the second size.

3. The computer-implemented method of claim 1, wherein the third size is the same as the first size.

4. The computer-implemented method of claim 1, wherein the third size is the same as the second size.

5. The computer-implemented method of claim 1, further comprising performing compositing operations using the image and the mask, if the first size and the second size are the same.

6. The computer-implemented method of claim 1, wherein the print data stream uses PDF as the print description language and the image and the mask are specified as a soft mask image.

7. The computer-implemented method of claim 1, wherein the mask comprises a distinct luminosity value for each pixel in the image.

8. The computer-implemented method of claim 1, wherein the method is performed on a system comprising at least one printer, at least one computer, and the at least one printer coupled to the at least one computer.

9. A non-transitory computer-readable medium that stores instructions, which when executed by a processor perform steps in a computer-implemented method, the computer-implemented method comprising:

receiving print data streams, in the form of print description language streams;

processing, by a language server, the print data streams, comprising:

parsing the print data streams to select at least one print data stream that includes image data associated with mask data for performing compositing operations, wherein the at least one print stream comprising at least one image of a first size, the image being associated with a mask of a second size;

comparing the first size to the second size;

scaling the image and the mask to a third size, if the first size and the second size are different based on the comparison; and performing compositing operations using the scaled image and the scaled mask, if the first size and second size are different, wherein the compositing operations comprise clipping the image based on an overlap of the mask of the third size overlaid on the image of the third size;

generating a composited object as a result of the compositing operations; and generating a display list including the composited object.

10. The non-transitory computer-readable medium of claim 9, wherein the third size is different from the first size and the second size.

11. The non-transitory computer-readable medium of claim 9, wherein the third size is the same as the first size.

12. The non-transitory computer-readable medium of claim 9, wherein the third size is the same as the second size.

13. The non-transitory computer-readable medium of claim 9, further comprising performing compositing operations using the image and the mask, if the first size and the second size are the same.

14. The non-transitory computer-readable medium of claim 9, wherein the print data stream uses PDF as the print description language and the image and the mask are specified as a soft mask image.

15. A system for performing compositing operations, the system comprising:

an input interface configured to receive print data streams, in the form of print description language streams;

a memory configured to store the print data streams; and a processor coupled to the input interface and the memory, wherein the processor is configured to execute instructions in the memory to perform the steps of:

processing, by a language server, the print data streams, comprising:

parsing the print data streams to select at least one print data stream that includes image data associated with mask data for performing compositing operations, wherein the at least one print stream comprising at least one image of a first size, the image being associated with a mask of a second size;

comparing the first size to the second size;

scaling the image and the mask to a third size, if the first size and the second size are different based on the comparison; and performing compositing operations using the scaled image and the scaled mask, if the first size and second size are different, wherein the compositing operations comprise clipping the image based on an overlap of the mask of the third size overlaid on the image of the third size;

generating a composited object as a result of the compositing operations; and generating a display list including the composited object.

16. The system of claim 15, wherein the third size is different from the first size and the second size.

17. The system of claim 15, wherein the third size is the same as the first size.

18. The system of claim 15, wherein the third size is the same as the second size.

19. The system of claim 15, further comprising performing compositing operations using the image and the mask, if the first size and the second size are the same.

20. The system of claim 15, wherein the print data stream uses PDF as the print description language and the image and the mask are specified as a soft mask image.

* * * * *